Dec. 5, 1967  A. S. MUNACH  3,356,027
RETARDATION-SENSING SAFING DEVICE FOR BOMB FUZE
Filed Aug. 27, 1965

Arnold S. Munach
INVENTOR.

BY
ATTORNEY.

AGENT.

United States Patent Office 3,356,027
Patented Dec. 5, 1967

3,356,027
RETARDATION-SENSING SAFING DEVICE
FOR BOMB FUZE
Arnold S. Munach, Rockville, Md., assignor to the United States of America as represented by the Secretary of the Navy
Filed Aug. 27, 1965, Ser. No. 483,376
4 Claims. (Cl. 102—76)

ABSTRACT OF THE DISCLOSURE

A safety and arming mechanism for a velocity-retarded gravity bomb having a retardation-sensing safing device which behaves both as a timer and an accelerometer which, depending upon the presence or the absence of a given deceleration force during a specific time interval following release of the bomb from the aircraft, regulates the speed of a movable shaft engaging the fuse arming rotor to clear the rotor for arming only when the shaft is moved from a path of travel a given distance.

---

Figure 1:
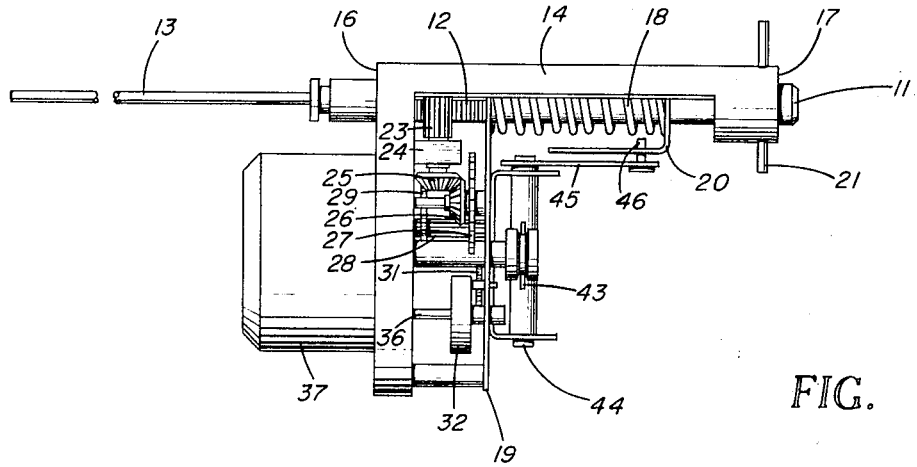

The invention described herein may be manufactured and used by or for the Government of the United States of America for governmental purposes without the payment of any royalties thereon or therefor.

During certain-low level bombing operations, a released free-falling drop bomb will assume an initial trajectory path very close to the path of travel of the aircraft and can therefore explode substantially directly beneath the aircraft. Under such conditions it is necessary to provide the gravity bomb with a motion-retarding means, such as a parachute or pop-out fins, for the purpose of decelerating the bomb a sufficiently long period of time to permit the aircraft to escape to a safe distance from the target before the bomb is detonated. Full deployment of the velocity-retarding means generally will sufficiently decelerate the free-falling bomb to provide the aircraft with enough time to escape the target area, but anything less than full deployment is unlikely to decelerate the bomb sufficiently in which case the aircraft may be damaged by the explosion. Devices have been provided, therefore, which are capable of determining whether or not the velocity-retarding means are fully deployed and which are designed to accordingly control the duration of the fuze-arming timing interval, as for example to shorten the fuze arming-time only if the motion retarding means have fully deployed. In certain of these low-level bombing operations, however, it may be desirable to set the bomb fuze with as short as possible a fuze-arming timing interval, in which case the importance to the safety of the aircraft of full deployment of the motion retarding means as quickly as possible after the release of the bomb is even more evident. Where such minimum settings are made it is essential that the retarding means not only function satisfactorily but that they do so almost immediately after bomb release so that retardation occurs almost throughout the entire bomb drop, otherwise the launching aircraft is susceptible to damage by the exploding bomb.

It is therefore an object of the present invention to provide a device which will prevent bomb detonation on ground impact, resulting in aircraft loss or damage, when an unretarded or an only partially retarded bomb is released at low altitude and follows beneath the aircraft to ground impact.

Another object of the invention is to provide a safety device which will clear a bomb fuze for arming a predetermined period of time after the bomb is released from the aircraft but may clear the fuze for arming prior to that time if a given bomb deceleration occurs within a specific time interval following release.

Still another object of the present invention is to provide a safety device for clearing a bomb fuze for arming only after the passage of a predetermined period of time following bomb release unless a velocity-retarding means becomes fully deployed during a specified time interval after bomb release, and which will not respond erroneously to bomb vibration or ground impact but to steady-state deceleration only.

Having these objects in view, the present invention provides a retardation-sensing device which behaves both as a timer and an accelerometer for regulating, in accordance with the presence or absence of the minimum design acceleration, the speed of a shaft engaging the fuze arming rotor and clearing the rotor for arming only upon movement of the shaft a given distance along its path of travel. The device consists of a spring-loaded shaft incorporating a gear rack, a reduction gearing network, a verge-type escapement having a star-type escape wheel and a pin-type pallet, an inertial mass supported within a tube by a helical spring, and linkage between the mass and the pin-pallet. Upon removal of a safety wire the spring-loaded shaft is driven out of the device at a rate controlled by the escapement. If the device is decelerating at a rate less than the design acceleration, the escapement remains engaged and the shaft is extracted in a given period of time. If, during a specific time interval following release of the bomb from the launching aircraft the device decelerates at a rate greater than the design acceleration, the inertial mass overcomes the restraining force of the helical spring and disengages the pallet from the star wheel, thereby permitting the gear train to free-wheel so that the spring-loaded shaft is no longer governed by the escapement and is extracted from the device almost instantaneously.

In the accompanying drawings, in which like reference numerals are used to designate similar parts throughout the several views, there is illustrated a preferred embodiment of the idea of this invention. The drawings, however, are for the purpose of illustration only, and are not to be taken as limiting the invention, the scope of which is to be measured entirely by the scope of the appended claims.

Figure 2:
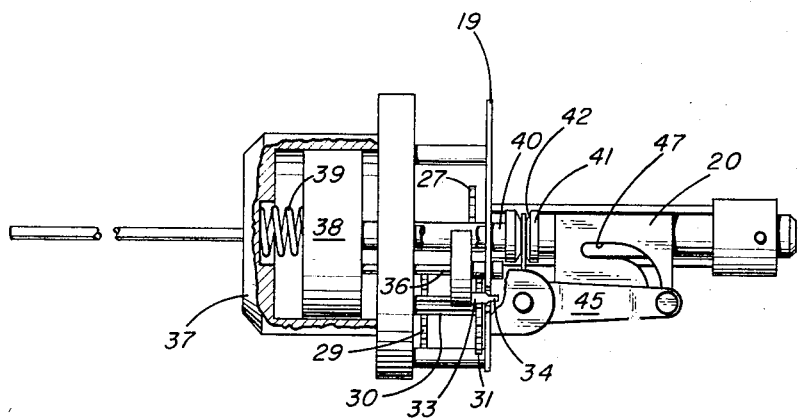

FIG. 1 is a side view of a device constructed in accordance with the teachings of the present invention having a portion of the cover therefor removed; and FIG. 2 is another side view of the device shown in FIG. 1.

Referring now to the drawings, and more particularly to FIG. 1 thereof, there is shown a shaft 11 having a gear rack portion 12 centrally located thereon and an elongated pin 13 at one end thereof, adapted for engaging the fuze arming rotor, mounted within housing 14 through apertures 16 and 17 positioned respectively in the forward and aft sections of the housing. A coil spring 18 is compressed between a plate member 19 secured to the housing and one side of an L-shaped bracket 20, which may be integrally connected to shaft 11 near the aft end thereof, thereby urging shaft 11 to move axially toward the rear. The apparatus is retained in a safe condition by an arming wire 21 passing through aligned transverse openings in the aft end of housing 14 and the shaft 11, and so preventing rearward movement of the shaft 11 by spring 18.

The rate of travel of the shaft 11 when arming wire 21 is removed is controlled by the engagement with gear rack 12 by an escape assembly comprising a spur gear 23 driven by rack 12 and mounted on one end of a shaft rotatable within subhousing 24, a bevel gear 25 mounted on the other end of spur-gear shaft and engaging a second bevel gear 26 mounted on the shaft of a large gear 27 for rotating gear 27, additional gearing reduction including spur gear 28, gear 29, and spur gear 30 (FIG. 2), a star-type escapement wheel 31 and a pin-type pallet 32. A pair of pins 33 on pallet 32 engage star wheel 31 and have a reduced diameter portion 34 at the aft ends thereof, which extend through apertures in the housing plate 19. Thus the spring 18 drives the shaft 11 at a rate which is controlled by the escapement assembly, extracting the pin 13 from engagement with the fuze arming rotor in a predetermined period of time. Pallet 32, however, is mounted upon a shaft 36 which is axially movable in response to forces of the deceleration, and is capable, with a given deceleration, of moving forwardly to disengage the large diameter portion of pins 33 from the star wheel 31. This in turn permits the gear train to the spring-loaded shaft 11 to free-wheel, permitting instantaneous extraction of the pin 13 from the fuze rotor.

Within a housing portion 37 positioned in the forward area of the device there is located an inertial weight 38 normally maintained in an aftward position by a helical spring 39. Pallet shaft 36 is secured to the weight 38 for movement therewith responsive to deceleration whereby when a given deceleration occurs the large weight 38 overcomes the restraining of the helical spring 39, moving so as to compress the spring and pulling the pallet out of engagement with the star wheel. A second, central shaft 40 also is connected to the inertial weight 38. The shaft 40 extends through housing plate member 19, terminating in a disc portion 41 having thereon an annular groove 42. A U-shaped collar 43 is connected to a rotatable shaft 44 mounted on plate 19 and is so positioned thereon that the legs of the collar are received within groove 42 in disc 41. A lever member 45 is provided with a transverse pin 46 at one end thereof and is secured at its other end to the rotatable shaft 44 for rotation therewith. The L-shaped bracket 20 mounted on shaft 11 is provided on its side lying parallel to the plane in which lever 45 moves with a curved slot 47 for receiving therein the lever pin 46.

Thus it may be seen that the intertial weight 38 is mounted within the support structure of the device so that it is free to move forward only while the L-shaped bracket 20 on shaft 11 is in a position to receive the lever pin 46 within the bracket slot 47. At any other time forward movement of the weight is prevented since such movement would require coincident movement of shaft 40, hence rotation of the shaft 44 because of the engagement of the legs of collar 43 in groove 42 of disc 41 mounted on the end of shaft 40. Shaft 44 of course is incapable of rotation because of the engagement of lever pin 46 with the end surface of the L-shaped bracket 20.

This feature provides safety during transportation and discriminates against deceleration due to ground impact and vibration and shock associated with bomb and fin-deployment, as opposed to the steady state deceleration caused by the fully deployed bomb velocity-retarding system.

In operation, when the arming wire 21 is extracted upon the release of the bomb from the aircraft, shaft 11 with its gear rack portion 12 begins moving aft under the force of spring 18, and the escapement begins timing out, effectively controlling the rate of movement of the shaft 11. During a specific time interval following bomb release, during which lever pin 46 is aligned with slot 47 in the shaft bracket 20, the inertial weight 38 is freed for forward movement if sufficient decelerating forces are present. Therefore, if the bomb velocity-retarding means have fully deployed, inertial weight 38 will move forward, the pins 33 of pallet 32 will be removed from engagement with the star escapement wheel 31, permitting the gear train to the spring loaded shaft 11 to free wheel. Thus the pin 13 on shaft 11 extracts itself from the fuze virtually instantaneously, not being governed by the escapement, and thereby clears the fuze rotor for arming.

At any other time, however, either before or after the period of time when lever pin 46 is aligned with slot 47, the inertial weight 38 is held fast in its aft position by the engagement of lever pin 46 with the shaft bracket 20. In his case, the pin 13 will be extracted from the fuze rotor in the predetermined period of time established by the normal rate of travel of the shaft 11 and its gear rack 12, which is governed by the escapement.

In an unretarded drop with a minimum selectable fuze arming time less than that normally required for extraction of the pin 13, the pin 13 will not clear the fuze rotor and the rotor will jam against the pin 13 when the fuze attempts to arm. Thus the unsafe situation aforedescribed will be prevented.

Thus regardless of whether the bomb is retarded or unretarded during its drop, unless retardation occurs during the specified time interval, that is during the incremental portion of the travel of the gear rack 12 in which the lever-pin 46 and the bracket-slot 47 are aligned, arming of the fuze will be delayed at least a predetermined minimum period of time. Only if retardation occurs during the aforementioned specified time interval will the escapement assembly be permitted to free wheel, allowing instantaneous withdrawal of the engagement pin 13 through the action of spring 18, to clear the fuze rotor for arming prior to completion of the predetermined minimum period of time following bomb release.

The present device gives protection to aircraft during low-level bombing operations. The entire device is unique in the achievement of its goals, which are peculiar to particular weapons and to particular operations. A novel feature of the device is the manner in which the pallet is able to engage or disengage the escape wheel, controlled as it is by means of a spring-biased weight. Thus the device governs the rate of motion of the pin 13 so that a predetermined minimum period of time is required for full pin extraction when there are insufficient g-forces present. However, when sufficient g-forces are present in the prescribed direction during a specified time interval following bomb release, then, and only then, is the pallet disengaged from the star wheel and the escapement action nullified.

An added feature of this invention is that the pins 33 on the pallet 32 are designed with a tapered section between the different diameter portions so that they are self-engaging. Upon removal of loading in excess of the design acceleration, or its equivalent ,the helical spring 39 restores the weight 38, which in turn re-engages the pallet. This feature permits the device to be readily reset after checkout. The resetting is achieved simply by manually depressing the spring-loaded shaft 11, driving the gear train and escapement wheel backwards and causing the pallet to oscillate, and relocking the device with a safety wire 21.

Obviously, many modifications and variations of the present invention are possible in light of the above teachings. It is therefore to be understood that, within the scope of the appended claims, the invention may be practiced otherwise than as specifically described with respect to the aforesaid preferred embodiment.

What is claimed is:
1. A safety device for a fuze in a velocity-retarded gravity bomb comprising:
    a pin engaging said fuze and movable from a first position wherein it prevents fuze arming to a second position wherein the fuze is cleared for arming,
    stored energy spring means for moving said pin from said first position to said second position,
    means for governing the rate of movement of said pin by said spring means whereby a predetermined minimum period of time is required for said spring means to move said pin from said first position to said second position,
    said pin including a gear rack incorporated thereon and said governing means comprises a reduction gearing network engaging said gear rack, a verge-type escapement engaging said network and having a star-type escape wheel, a pallet member having mounted thereon a pair of pins, whereby said pallet member pins may engage said star-wheel to control the rate of movement of said fuze-engaging pin, and means responsive only to deceleration occurring during a specified incremental portion of said predetermined minimum period of time for inactivating said governing means and permitting instantaneous movement of said pin to said second position by said stored energy spring means, said pallet member being movable relative to said star-type escape wheel, and each of said pallet pins having a reduced diameter portion at one end thereof, whereby the large ends of the pallet pins may engage the star wheel to control the rate of movement of the fuze-engaging pin, but when the pallet is moved the star wheel is not engaged by the reduced diameter portions of the pallet pins and the reduction gearing network is permitted to free-wheel.

2. The device of claim 1 wherein said deceleration-responsive governing-inactivation means includes a spring-biased inertial weight, a rod connecting said intertial weight and said pallet member for moving said pallet member when said inertial weight moves against the spring under the decelerating force accompanying bomb-retardation, lever means rotatably linked at one end of the inertial weight for actuation thereby in response to deceleration, a pin secured to the other end of the lever and extending transversely therefrom, and a plate secured to the fuze-engaging pin member for movement therewith and having a curved slot provided therein, said plate being positioned in abutting relation with said lever pin for normally preventing rotation of the lever and movement of the inertial weight, and adapted to receive the lever pin within said slot responsive to deceleration when the pin and slot are aligned, whereby the inertial weight is free to inactivate the governing means only during the incremental portion of the path of movement of the fuze-engaging pin from said first to said second position wherein the slot in the plate attached thereto is aligned with said lever pin.

3. The device of claim 2 including means for locking said fuze-engaging pin in the first position until the bomb is released from the aircraft.

4. The device of claim 1 wherein the pallet pins are tapered between the two different diameter portion so that they are self-engaging with the star wheel.

References Cited

UNITED STATES PATENTS

| 3,263,035 | 7/1966 | Semenoff | 102—4 X |
| 2,789,508 | 4/1957 | Rove et al. | 102—83 |
| 3,316,841 | 5/1967 | McFann et al. | 102—76 |

BENJAMIN A. BORCHELT, *Primary Examiner.*

G. H. GLANZMAN, *Assistant Examiner.*